UNITED STATES PATENT OFFICE.

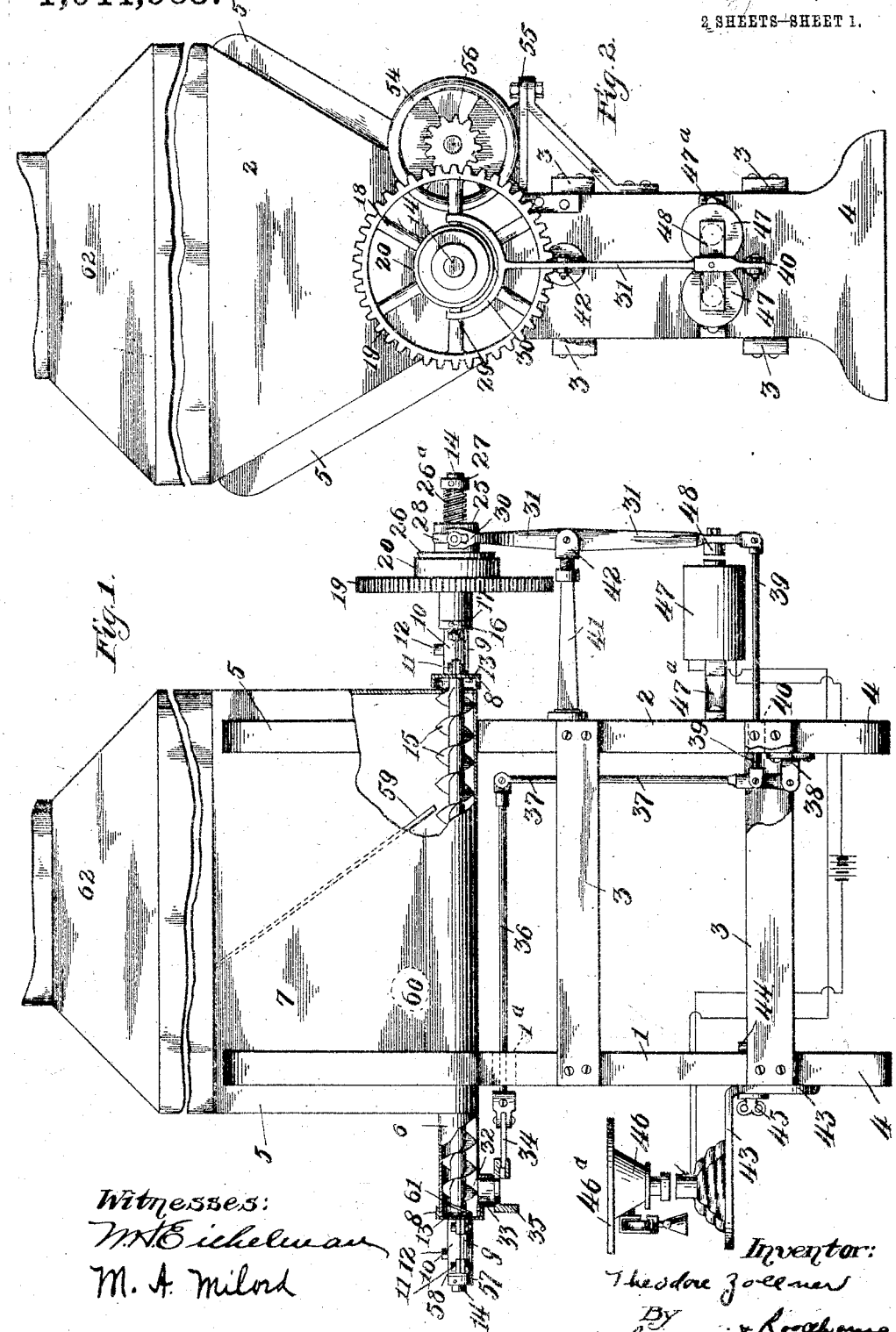

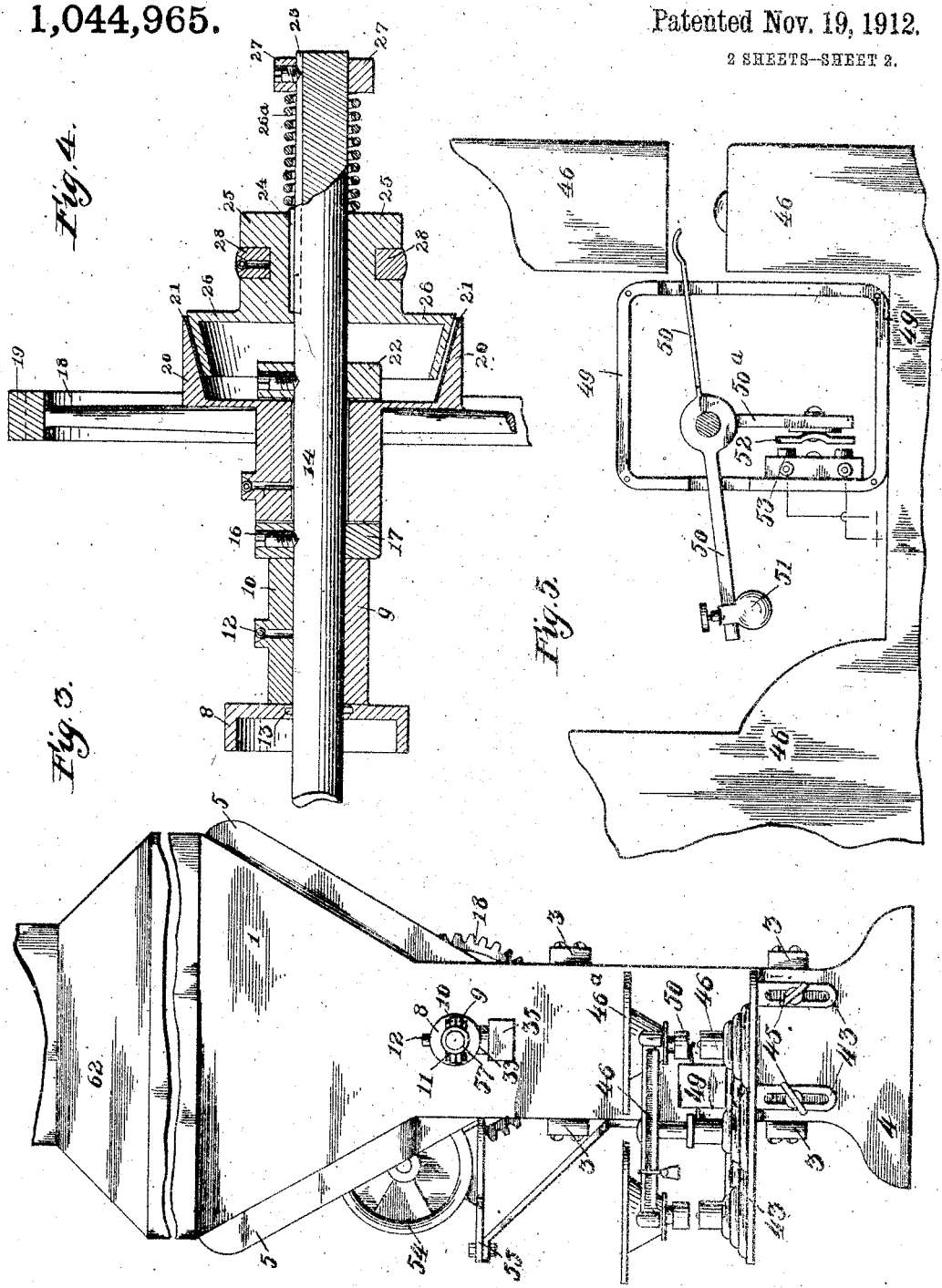

THEODORE ZOLLNER, OF DULUTH, MINNESOTA.

AUTOMATIC WEIGHING DEVICE.

1,044,965.    Specification of Letters Patent.    Patented Nov. 19, 1912.

Application filed November 6, 1911. Serial No. 658,682.

*To all whom it may concern:*

Be it known that I, THEODORE ZOLLNER, a citizen of the United States, and a resident of Duluth, in the county of St. Louis and State of Minnesota, have invented a new and useful Automatic Weighing Device, of which the following is a specification.

My present invention has for its object the provision of suitable mechanism for automatically delivering to a suitable scale or weighing device which may be set to weigh the desired quantity, the amount of the commodity which will balance the scale and will then automatically shut off the supply.

While my device may be employed with a great variety of commodities, it is especially designed for and useful in handling such commodities as flour, fine pulverized sugar, corn starch, ground coffee, potato flour, and the like, which on account of their consistency will pack and clog ordinary weighing mechanisms, and on that account are at present weighed out and packed by hand.

I attain the above object by the mechanism illustrated in the accompanying drawings, in which:—

Figure 1 is an elevation, partially in section, of one side of my invention; Fig. 2 is an elevation of the rear end; Fig. 3 is an elevation of the front end; Fig. 4 is a sectional detail of the clutch; and Fig. 5 is a detail of the electric contact device operable by the scale.

Similar reference numerals refer to similar parts throughout the several views.

The reference numerals 1 and 2 designate the front and rear standards of the frame for holding the mechanism. These standards are substantially Y shaped, and are held in suitable relation to one another by the side bars 3. The standards are broadened out at the bottom to form a substantial and suitable foot or base, 4, which may be screwed down to a table or floor for greater rigidity, if desired. The arms, 5, forming the upper part of the standards, 1 and 2, approach each other at an acute angle and at their juncture are rounded to receive the circular conveyer tube, 6, the top of which throughout most of its extent is cut away to provide an opening into the hopper, the walls, 7, of which are secured to the conveyer tube, 6, and the arms, 5, of the standards.

As will be seen clearly from Fig. 1, the conveyer tube extends beyond both the front and rear of the hopper, and is closed on both ends by the caps, 8, which screw to the ends thereof. The caps, 8, are centrally bored, and extended to form the journals or boxings, 9, which have the covers, 10, secured thereto by suitable nuts, 11. Suitable oiling holes, 12, are provided in the journal covers, 10, and the bore in the caps, 8, is provided with an annular groove, 13, for packing to prevent the material being weighed getting into the bearings, and the oil from the bearings getting into the material being weighed. Mounted in the journals, 9, is a shaft, 14, upon which, within the conveyer tube, and extending to a short distance from the forward end thereof is secured a helical or screw conveyer blade, 15. To drive the shaft, 14, and conveyer blade, 15, I provide the following structure: Upon the shaft, just back of the rear journal is secured by a screw, 16, a set collar, 17, back of which rotatably mounted upon said shaft, 14, is a wheel, 18, the periphery of which is provided with gear teeth, 19, and upon the rear face of which is provided the conical receiving member, 20, which may be lined with leather or other friction material, 21, of a conical clutch. Another set collar, 22, to the rear of the wheel, 18, keeps it in position upon the shaft, 14.

The shaft, 14, is provided with a slot or splineway, 23, into which projects the key or feather, 24, carried by the collar 25, upon the forward end of which is the entering member, 26, of the cone clutch. The collar, 25, and member 26, are normally pressed forward into engagement by a spring, 26ª, provided about the shaft, 14, between the rear face of the collar, 25, and a set collar, 27, upon the rear end of the shaft. The collar, 25, has an annular channel therein into which sets a collar, 28, having lateral lugs or projections, 29, thereon which are adapted to be engaged by the arms 30 of a yoke ended lever arm, 31, of a system of levers to be hereafter described.

Upon the under part of the forward end of the conveyer tube, 6, which extends some distance in front of the hopper is a port, 32, for the delivery of the material from the conveyer to the scale. This port has a downwardly extending pipe, 33, about it, the bottom of which is closed by a horizontally sliding gate, 34. To the front of the tube or pipe, 32, is a downwardly extending apron, 33, for preventing the material from being scattered by the rapid closing of the gate, 34.

To open and close the gate, 34, and at the same time to throw the clutch in or out I have provided the following lever mechanism: A rod, 36, suitably secured to the door, 34, extends backwardly through an opening, 1ª, in the standard, 1, to a point near the rear standard, 2. Pivotally connected with the end of the rod, 36, is a lever arm, 37, pivoted at its lower end to a bracket, 38, secured near the bottom of the standard, 2. Pivoted to the arm, 37, just above the point of its attachment with the bracket, 38, is another rod or link, 39, which runs rearwardly through a hole, 40, in the standard 2, to the lever arm, 31, heretofore referred to. This lever arm, 31, is pivoted at about its center upon a bracket, 41, secured to the rear of the standard, 2, and which has facilities 42, for taking up any play that may develop in the lever system. It will now be seen that if power is applied to the arm, 31, to cause the disengagement of the clutch and the stoppage of the shaft, 14, the same movement will, through the link, 39, lever arm, 37, and rod, 36, close the gate, 34.

Just below the gate, 34, I have provided the bracket, 43, for holding the scales, the height of which may be adjusted with the bolts, 44, and wing nuts, 45.

Positioned upon the bracket, 43, are the scales, 46, so that the weighing platform, 46ª, is under the port, 32, and to operate the mechanism so as to stop the conveyer and close the gate, 34, when the proper amount has been delivered to the scale pan, I have provided the electromagnet, 47, secured to a suitable bracket, 47ª, upon the rear face of the standard, 2. The poles of this magnet extend adjacent a part of the lever arm, 31, where it is pivoted to the link, 39, and at which point it is provided with a suitable armature, 48. Under the scale arm I have provided a contact box, 49, in which is pivoted an arm, 50, held against the descending end of the scale beam by a weight, 51, upon its other end. Depending from the arm 50 is an arm, 50ª, to which is secured the piece, 52, for making and breaking the circuit as it is carried into or out of contact with the points, 53, which are arranged in circuit with a suitable source of electric energy and the electromagnet, 47. It is now obvious that when the scale is empty and the scale beam is up, the contact will be broken and by the action of the spring, 26ª, the clutch is in engagement and the gate 34 is open. When the proper amount of material has been delivered to the scale pan, it sinks, electrical contact is made, the magnet operates, and the clutch is thrown out and the gate, 34, closed.

To drive the shaft, 14, I have provided an electric motor, 54, upon a bracket, 55, upon the standard, 2, the motor is provided with a pinion, 56, which meshes with the peripheral teeth, 19, of the wheel, 18.

To take the thrust of the shaft, 14, which is considerable in working commodities which are inclined to pack, I have provided upon the forward end of the shaft a set collar, 57, between which and the forward journal 9 is a fiber friction washer, 58.

There are two features still to be described which I find extremely desirable, if not necessary, in order to prevent the packing of the commodity and the stoppage of the mechanism. The first of these features is the partition 59 set in the hopper at 90° angle with the shaft, 14, which only permits material to reach the conveyer from the rear of the hopper and leaves a free space, 60, around or above the forward end of the conveyer. The conveyer, because of its tendency to pack and clog, takes the commodity unevenly, sometimes more, sometimes less than the proper amount. The excess instead of stopping the machinery, accumulates in the free space, 60, and from there falls back into the conveyer to make up the deficiency which occurs when the conveyer fails to get all it should. This arrangement maintains an even and uniform delivery of the material from the port, 32.

The second feature for preventing the clogging of the machine consists of the knife, 61, secured to the shaft, 14, just back of the forward cap, 8. The blade of this knife is slanted in an opposite direction to the conveyer blade, 15, and serves to prevent any of the commodity becoming packed in the forward end of the conveyer tube. A suitable cover 62 is provided for the hopper.

Having thus described my invention, what I claim as new, and desire to secure by Letters Patent, is:—

1. A weighing mechanism comprising a hopper, a shaft disposed longitudinally in the bottom thereof, a helical or screw conveyer blade secured to said shaft, a port from said hopper adjacent said conveyer, a driven wheel rotatably mounted upon said shaft, a friction clutch for engaging and disengaging said driven wheel and said shaft, a spring for holding said clutch normally in engagement, a gate for closing said port, co-acting lever arms for opening and closing said gate and throwing said clutch out of engagement, an electromagnet for operating said lever arms to disengage said clutch and close said gate, scales and contact mechanism actuated by the movement of said scales for causing a current to flow through said magnet.

2. A weighing mechanism comprising a pair of scales, a hopper, a conveyer tube extending longitudinally of said hopper, a port from said conveyer tube to said scales, a helical or screw conveyer in said conveyer tube, a gate to close said port, a friction clutch for connecting and disconnecting said conveyer from a source of power, a spring for normally holding said clutch in engagement, coupled lever arms for simultaneously opening said gate and releasing said clutch, and means controlled by the movement of said scales for operating said lever arms.

3. In a weighing machine comprising a pair of scales, a hopper, a conveyer tube disposed longitudinally of said hopper, an opening from said hopper into said tube, an opening from said tube above said scales, a helical or screw conveyer in said tube and a knife blade set in the end of said conveyer at an angle with said helical screw.

4. In a weighing machine comprising a pair of scales, a hopper, a helical or screw conveyer for conveying material from said hopper to said scales and a knife blade disposed in the end of said conveyer at an angle with the screw thereof.

5. In a weighing machine comprising a pair of scales, a hopper, a conveyer tube for conveying material from said hopper to said scales, a screw conveyer in said conveyer tube, an opening from said hopper to said tube, an opening from said conveyer to said scales, and a compartment intermediate said openings into which any excess taken by said screw from said hopper may be discharged and from which any deficiency may be made up.

In testimony whereof I affix my signature in the presence of two witnesses.

THEODORE ZOLLNER.

Witnesses:
H. A. EARNSHAW,
J. E. MACGREGOR.